(12) United States Patent
Tan (10) Patent No.: US 11,207,948 B2
(45) Date of Patent: *Dec. 28, 2021

(54) THERMAL MANAGEMENT SYSTEM AND FLOW CONTROL DEVICE

(71) Applicant: Hangzhou Sanhua Research Institute Co., Ltd., Zhejiang (CN)

(72) Inventor: Yongxiang Tan, Zhejiang (CN)

(73) Assignee: Hangzhou Sanhua Research Institute Co., Ltd., Zhejiang (CN)

( * ) Notice: Subject to any disclaimer, the term of this patent is extended or adjusted under 35 U.S.C. 154(b) by 163 days.

This patent is subject to a terminal disclaimer.

(21) Appl. No.: 16/626,504

(22) PCT Filed: Jun. 25, 2018

(86) PCT No.: PCT/CN2018/092615
§ 371 (c)(1),
(2) Date: Dec. 24, 2019

(87) PCT Pub. No.: WO2019/001385
PCT Pub. Date: Jan. 3, 2019

(65) Prior Publication Data
US 2020/0148039 A1    May 14, 2020

(30) Foreign Application Priority Data
Jun. 27, 2017   (CN) .......................... 201710499205.2

(51) Int. Cl.
*B60H 1/00* (2006.01)
*B60H 1/32* (2006.01)
*B60H 1/22* (2006.01)

(52) U.S. Cl.
CPC ............. *B60H 1/3222* (2013.01); *B60H 1/00* (2013.01); *B60H 1/00278* (2013.01);
(Continued)

(58) Field of Classification Search
CPC .... B60H 1/3222; B60H 1/32284; B60H 1/00; B60H 1/00278; B60H 1/00485; B60H 1/2221; B60H 1/323
(Continued)

(56) References Cited

U.S. PATENT DOCUMENTS

2010/0012295 A1    1/2010   Nemesh et al.
2010/0307723 A1   12/2010   Thomas et al.
(Continued)

FOREIGN PATENT DOCUMENTS

CN      101633306 A     1/2010
CN      101855100 A    10/2010
(Continued)

OTHER PUBLICATIONS

Extended European Search Report dated Mar. 16, 2021 in connection with European Application No. 18823963.6.
(Continued)

*Primary Examiner* — Davis D Hwu
(74) *Attorney, Agent, or Firm* — Wolf, Greenfield & Sacks, P.C.

(57) ABSTRACT

A thermal management system includes a refrigerant system, which includes a compressor, a flow control device, a valve member, a first heat exchanger, a second heat exchanger, and a third heat exchanger. The flow control device includes a first throttle unit, a second throttle unit, and a valve assembly; the flow control device includes a first port, a second port, and a third port; a first connection port of the first heat exchanger is in communication with the second port, and a first connection port of the second heat exchanger is in communication with the third port, while a first connection port of the third heat exchanger is in
(Continued)

communication with the first port. The thermal management system includes a first operating state and a second operating state.

20 Claims, 4 Drawing Sheets

(52) U.S. Cl.
CPC ....... B60H 1/00485 (2013.01); B60H 1/2221 (2013.01); B60H 1/323 (2013.01); B60H 1/32284 (2019.05)

(58) Field of Classification Search
USPC ........................................................ 165/202
See application file for complete search history.

(56) References Cited

U.S. PATENT DOCUMENTS

| | | | |
|---|---|---|---|
| 2015/0121939 A1 | 5/2015 | Takeuchi et al. | |
| 2020/0070628 A1* | 3/2020 | Tan | B60H 1/00 |
| 2020/0108690 A1* | 4/2020 | Tan | H01M 10/625 |

FOREIGN PATENT DOCUMENTS

| | | |
|---|---|---|
| CN | 102104181 A | 6/2011 |
| CN | 102555726 A | 7/2012 |
| CN | 103129348 A | 6/2013 |
| CN | 103287253 A | 9/2013 |
| CN | 103707736 A | 4/2014 |
| CN | 104051816 A | 9/2014 |
| CN | 104169112 A | 11/2014 |
| CN | 104422024 A | 3/2015 |
| CN | 105299970 A | 2/2016 |
| CN | 105356003 A | 2/2016 |
| CN | 105650780 A | 6/2016 |
| CN | 205718042 U | 11/2016 |
| EP | 0 800 940 A2 | 10/1997 |
| EP | 3 647 679 A1 | 5/2020 |
| JP | 2014-037182 A | 2/2014 |

OTHER PUBLICATIONS

CN201710499205.2, Jan. 20, 2020, First Office Action.
First Office Action for Chinese Application No. 201710499205.2, dated Jan. 20, 2020.
18823963.6, Mar. 16, 2021, Extended European Search Report.
International Search Report and Written Opinion for International Application No. PCT/CN2018/092615, dated Sep. 12, 2018.

* cited by examiner

Figure 7

THERMAL MANAGEMENT SYSTEM AND FLOW CONTROL DEVICE

RELATED APPLICATIONS

This application is a national stage filing under 35 U.S.C. § 371 of International Patent Application Serial No. PCT/CN2018/092615, filed Jun. 25, 2018, which claims priority to Chinese Patent Application No. 201710499205.2 titled "THERMAL MANAGEMENT SYSTEM AND FLOW CONTROL DEVICE", filed on Jun. 27, 2017 with the National Intellectual Property Administration, PRC. The entire contents of these applications are incorporated herein by reference in their entirety.

FIELD

The present application relates to the technical field of thermal management systems.

BACKGROUND

Generally, a temperature of a heat generating device, such as a battery and etc., and a passenger compartment is controlled by a thermal management system. However, the thermal management system capable of controlling temperatures of the heating device, such as the battery and etc., and the passenger compartment, is complex. Therefore, it is necessary to improve the conventional technology to solve the above technical problem.

SUMMARY

An object of the present application is to provide a flow control device and a thermal management system, which facilities simplifying the thermal management system.

To realize the above object, a technical solution is provided as follows.

A thermal management system includes a flow control device including a first throttling unit, a second throttling unit and a valve component, the flow control device includes a first end port, a second end port and a third end port;

a first connecting port of the second throttling unit and a first connecting port of the valve component are both communicable with the first end port, a second connecting port of the second throttling unit and a second connecting port of the valve component are both communicable with the second end port, a third connecting port of the valve component is communicable with a first connecting port of the first throttling unit, and a second connecting port of the first throttling unit is communicable with the third end port;

the thermal management system further includes a first heat exchanger, a second heat exchanger and a third heat exchanger, the first end port of the flow control device is in communication with a first connecting port of the third heat exchanger, the second end port of the flow control device is in communication with a first connecting port of the first heat exchanger, and the third end port of the flow control device is in communication with a first connecting port of the second heat exchanger; and the thermal management system further includes a first working state and a second working state, a refrigerant in the heat management system flows into the first end port of the flow control device from the first connecting port of the third heat exchanger in the first working state of the thermal management system, the refrigerant in the thermal management system flows into the second end port of the flow control device from the first connecting port of the first heat exchanger in the second working state, and the refrigerant in the thermal management system flows out of the flow control device through the third end port in the first working state and the second working state of the thermal management system.

A flow control device is also provided in the present application.

A flow control device includes a first throttling unit, a second throttling unit and a valve component, the flow control device includes three end ports, the first throttling unit and the second throttling unit both includes two connecting ports, and the valve component includes three connecting ports; and a first connecting port of the second throttling unit is in communication with a first end port of the flow control device, a second connecting port of the second throttling unit is in communication with a second end port of the flow control device, a first connecting port of the valve component is in communication with the first end port of the flow control device, a second connecting port of the valve component is in communication with the second end port of the flow control device, a third connecting port of the valve component is in communication with the a first connecting port of the first throttling unit, and a second connecting port of the first throttling unit is in communication with a third end port of the flow control device.

The thermal management system provided in the present application includes a flow control device, and three end ports of the flow control device are in communication with the thermal management system, which is beneficial to simplify the thermal management system.

DETAILED DESCRIPTION OF EMBODIMENTS

There may be multiple implementations for a thermal management system according to technical solutions of the present application. At least one implementation may be applied to a thermal management system for a vehicle, and at least one implementation may be applied to other thermal management systems such as a commercial thermal management system or domestic thermal management system. A thermal management system for a vehicle is taken as an example, which is illustrated hereinafter in conjunction with the drawings. Referring to FIGS. 1-7, a thermal management system at least includes a refrigerant system. The refrigerant system includes a compressor 10, a flow control device 15, a valve part 16, a first heat exchanger 11, a second heat exchanger 12 and a third heat exchanger 13. The flow control device 15 includes a first end port 1501, a second end port 1502 and a third end port 1503. A first connecting port of the first heat exchanger 11 is in communication with the second end port 1502, a first connecting port of the second heat exchanger 12 is in communication with the third end port 1503, and a first connecting port of the third heat exchanger 13 is in communication with the first end port 1501. The first connecting port of the first heat exchanger 11 may be in communication with the first connecting port of the third heat exchanger 13 through the flow control device 15, and/or, the first connecting port of the first heat exchanger 11 may be in communication with first connecting port of the second heat exchanger 12 through the flow control device 15. The first connecting port of the third heat exchanger 13 may be in communication with the first connecting port of the second heat exchanger 12 through the flow control device 15, and/or, the first connecting port of the third heat exchanger 13 may be in communication with first connecting port of the first heat exchanger 11 through the flow control device 15. The valve part 16 at least includes a first communication port 1601, a second communication port 1602, a third communication port 1603 and a fourth communication port 1604. The valve part 16 is in communication with the refrigerant system in a way as follows. The first communication port 1601 is communicable with an outlet of the compressor 10. The fourth communication port 1604 is communicable with an inlet of the compressor 10, or communicable with the inlet of the compressor 10 through a gas-liquid separator 14. The second communication port 1602 is communicable with the second connecting port of the first heat exchanger 11. The third communication port 1603 is communicable with the second connecting port of the third heat exchanger 13. The thermal management system includes a first working state and a second working state. In the first working state of the thermal management system, the valve part 16 works in a first working state of the valve part 16. In the second working state of the thermal management system, the valve part 16 works in a second working state of the valve part 16. In the first working state of the valve part 16, the first communication port 1601 and the third communication port 1603 are conducted, and the fourth communication port 1604 and the second communication port 1602 are conducted. In the second working state of the valve part 16, the first communication port 1601 and the second communication port 1602 are conducted, and the third communication port 1603 and the fourth communication port 1604 are conducted. It is understood that, when the thermal management system is operated, in a case that the valve part 16 is in the first working state, a refrigerant exhausted from the compressor 10 enters the second connecting port of the third heat exchanger 13 through the valve part 16, and then enters the first end port of the flow control device 15 through the first connecting port of the third heat exchanger 13; the refrigerant entering the flow control device 15 then flows out through the third end port and/or the second end port of the flow control device 15, and finally enters the first connecting port of the first heat exchanger 11 and/or the first connecting port of the second heat exchanger 12. In a case that the valve part 16 is in the second working state, the refrigerant exhausted from the compressor 10 enters the second connecting port of the first heat exchanger 11 through the valve part 16, and then enters the second end port of the flow control device 15 through the first connecting port of the first heat exchanger 11; the refrigerant entering the flow control device 15 then flows out through the first end port and/or the second end port of the flow control device 15, and finally enters the first connecting port of the third heat exchanger 13 and/or the first connecting port of the second heat exchanger 12. When the refrigerant is in liquid phase or in gas-liquid two phase, a gas-liquid separator may be arranged. A gas-liquid two-phase refrigerant is separated by the gas-liquid separator; a liquid refrigerant is stored in the gas-liquid separator, while a gas-refrigerant of a low temperature and low pressure enters the compressor 10 and is compressed to be a refrigerant of a high temperature and high pressure by the compressor 10. If the compressor 10 accepts a liquid refrigerant, the gas-liquid separator may be unnecessary. The gas-liquid separator may be replaced by a liquid receiver. If the refrigerant is not in gas-liquid two phase, the gas-liquid separator may be unnecessary.

Figure 6:
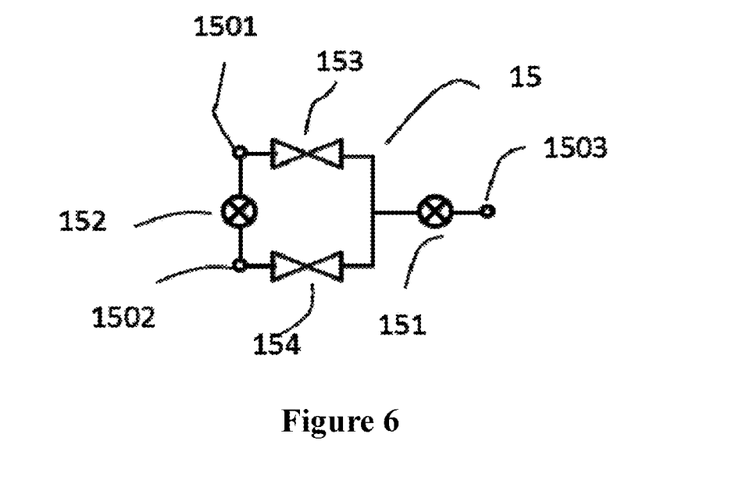
FIG. 6 is a schematic diagram of a flow control device according to another embodiment.

Referring to FIG. 6, the flow control device 15 includes a first throttling unit 151, a second throttling unit 152 and a valve component. The valve component includes a first connecting port, a second connecting port, and a third connecting port. The first connecting port of the valve component and a first connecting port of the second throttling unit 152 are both in communication with the first end port 1501. The second connecting port of the valve component and a second connecting port of the second throttling unit 152 are both in communication with the second end port 1502. The third connecting port of the valve component is in communication with a first connecting port of the first throttling unit 151. A second connecting port of the first throttling unit 151 is in communication with the third end port 1503. The valve component includes a first valve unit 153 and a second valve unit 154. A first connecting port of the second valve unit 154 is in communication with the second connecting port of the valve component, that is, the first connecting port of the second valve unit 154 is in communication with the second end port. A second connecting port of the second valve unit 154 is in communication with the third connecting port of the valve component, that is, the second connecting port of the second valve unit 154 is in communication with the first connecting port of the first throttling unit 151. A first connecting port of the first valve unit 153 is in communication with the first connecting port of the valve component, that is, the first connecting port of the first valve unit 153 is in communication with the first end port. A second connecting port of the first valve unit 153 is in communication with third connecting port of the valve component, that is, the second connecting port of the first valve unit 153 is in communication with the first connecting port of the first throttling unit 151. The first valve unit 153 and the second valve unit 154 may be a stopping valve or a flow control valve. The valve device may be a first three-way valve (not shown in figure). The first three-way valve includes a three-way changeover valve or a three-way flow control valve. For example, the second connecting port of the second throttling unit 152 and a second connecting port of the first three-way valve are both in communication with the second end port 1502. The first connecting port of the second throttling unit 152 and a first connecting port of the first three-way valve are both in communication with the first end port 1501. A third connecting port of the first three-way valve is in communication with the third connecting port of the valve device or the first connecting port of the first throttling unit 151. The second connecting port of the first throttling unit 151 is in communication with third end port 1503. The third connecting port of the first three-way valve is a common port. The second throttling unit may have a function of two-way throttling, or one-way throttling. The first throttling unit may be a capillary, a throttling device, an electronic expansion valve, or a thermal expansion valve; and/or, the second throttling unit may be a capillary, a throttling device, an electronic expansion valve, or a thermal expansion valve. For example, if the first throttling unit is a capillary, a first connecting port of the capillary is in communication with the third connecting port of the valve device, and a second connecting port of the capillary is in communication with the third end port. If the second throttling unit is an electronic expansion valve, a first connecting port of the electronic expansion valve is in communication with the first end port, and a second connecting port of the electronic expansion valve is in communication with the second end port. A manufacturing cost may be reduced when a capillary is applied to the first throttling unit and/or the second throttling unit, while a control strategy is easy to realize when an electronic valve is applied. In a case that the thermal management system is in the first working state, a refrigerant exhausted from the compressor 10 enters the second connecting port of the third heat exchanger 13, and then enters the first end port 1501 of the flow control device 15 through the first connecting port of the third heat exchanger 13. The first throttling unit 151 and/or the second throttling unit 152 are switched on, the first valve unit 153 is switched on, and the second valve unit 154 is switched off. Thus, a part of the refrigerant enters the first throttling unit 151, and then enters the second heat exchanger 12 after being throttled. Another part of the refrigerant enters the second throttling unit 152, and then enters the first heat exchanger 11 after being throttled. In a case that the thermal management system is in the second working state, the refrigerant exhausted from the compressor 10 enters the second connecting port of the first heat exchanger 11, and then enters the second end port 1502 of the flow control device 15 through the first connecting port of the first heat exchanger 11. The first throttling unit 151 and/or the second throttling unit 152 are switched on, the second valve unit 154 is switched on, and the first valve unit 153 is switched off. Thus, a part of the refrigerant enters the first throttling unit 151, and then enters the second heat exchanger 12 after being throttled. Another part of the refrigerant enters the second throttling unit 152, and then enters the third heat exchanger 13 after being throttled. It is understood that, the flow control device 13 is able to throttle the refrigerant entering the first end port 1501, which flows out through the second end port 1502 and/or the third end port 1503. The flow control device 15 is also able to throttle the refrigerant entering the second end port 1502, which flows out through the first end port 1501 and/or the third end port 1503.

In a technical solution of the present application, the first valve unit 153 may be a first one-way valve, and the second valve unit 154 may be a second one-way valve. Specifically, the second connecting port of the second throttling unit 152 is in communication with the second end port 1502, and an inlet of the second one-way valve is in communication with the second connecting port of the valve component. The first connecting port of the second throttling unit 152 is in communication with the first end port 1501, and an inlet of the first one-way valve is in communication with the first connecting port of the valve component. An outlet of the first one-way valve and an outlet of the second one-way valve are in communication with the third connecting port of the valve component. The second connecting port of the first throttling unit 151 is in communication with the third end port 1503. In the first working state of the thermal management system, the valve part 16 is in the first working state, a refrigerant enters the valve part 16 through the first communication port 1601, and flows out of the valve part 16 through the third communication port 1603. Then the refrigerant enters the third heat exchanger 13, and enters the first end port 1501 through the third heat exchanger 13. The first throttling unit 151 and/or the second throttling unit 152 are switched on. If the first throttling unit 151 and the second throttling unit 152 are both switched on, a part of the refrigerant enters the first throttling unit 151 through the first one-way valve 153 and is throttled, while another part of the refrigerant flows out through the second end port after being throttled by the second throttling unit 152. Due to the throttling function of the second throttling unit 152, a pressure of the refrigerant at the second end port 1502 is smaller than that at the outlet of the second one-way valve. Thus, the refrigerant at the second end port 1502 can not flow to the first throttling unit 151 through the second one-way valve. Similarly, in the second working state of the thermal management system, the valve part 16 is in the second working state, the refrigerant enters the flow control device 15 through the second end port 1502, and the refrigerant at the first end port 1501 cannot flow to the first one-way valve. The valve component may adopt a one-way valve or two one-way valves without controlling, which is beneficial to save resources of a controller and reduce the cost.

Figure 4:
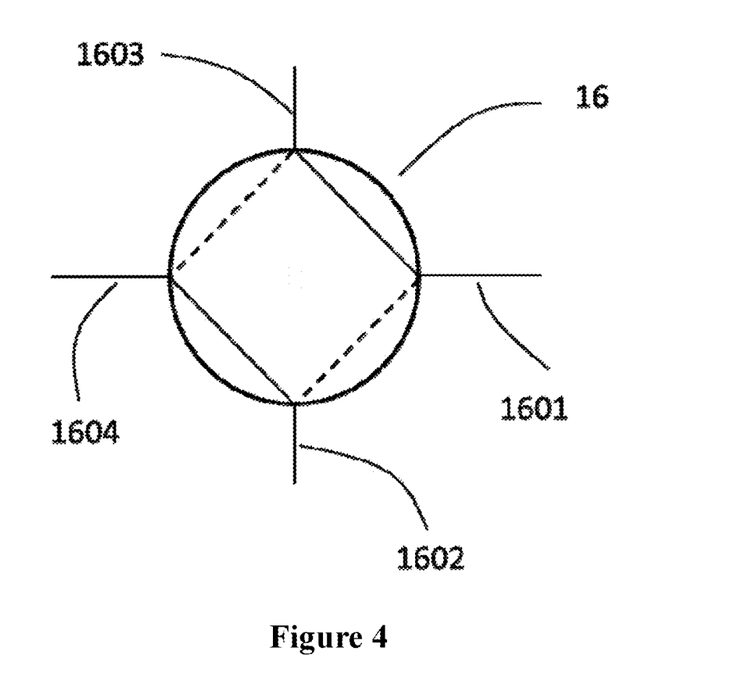
FIG. 4 is a schematic diagram illustrating a first working state of the valve part in FIG. 3.

The valve part 16 of the thermal management system may be a multi-way control valve including a first valve hole, a second valve hole, a third valve hole and a first inlet as shown in FIG. 4. The first inlet is in communication with the first communication port 1601, the first valve hole is in communication with the third communication port 1603, the second valve hole is in communication with the fourth communication port 1604, and the third valve hole is in communication with the second communication port 1602. In the first working state of the valve part 16, the multi-way control valve may conduct a passway between the first inlet and the first valve hole, and conduct a passway between the third valve hole and the second valve hole. In the second working state of the valve part 16, the multi-way control valve may conduct a passway between the first valve hole and the second valve hole, and conduct a passway between the third valve hole and the first inlet.

Figure 5:
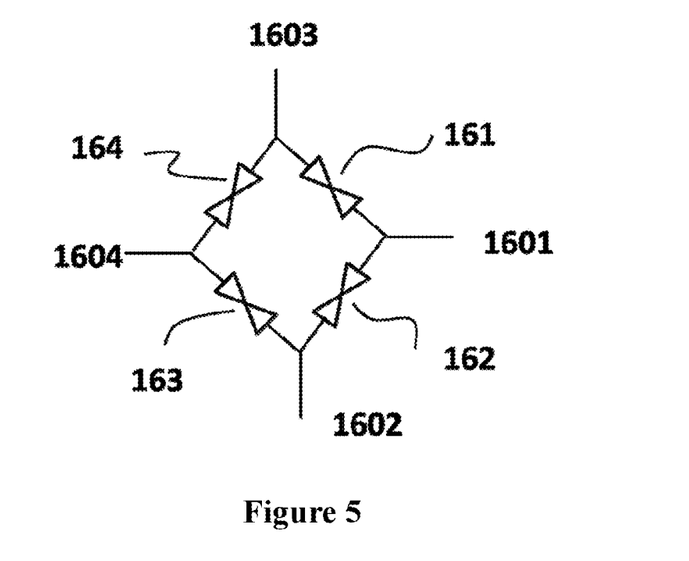
FIG. 5 is a schematic diagram of a valve part according to an embodiment.

Referring to FIG. 5, it is another embodiment of the thermal management system. Compared to the above embodiment, the valve part 16 in this embodiment includes a first valve module 161, a second valve module 162, a third valve module 163 and a fourth valve module 164. The first valve module 161, the second valve module 162, the third valve module 163 and the fourth valve module 164 may be a stopping valve or a two-way flow control valve. A first connecting port of the first valve module 161 and a first connecting port of the second valve module 162 are both in communication with the first communication port 1601. A second connecting port of the first valve module 161 and a second connecting port of the fourth valve module 164 are both in communication with the third communication port 1603. A second connecting port of the second valve module 162 and a second connecting port of the third valve module 163 are in communication with the second communication port 1602. A first connecting port of the third valve module 163 and a first connecting port of the fourth valve module 164 are both in communication with the fourth communication port 1604. In the first working state of the valve part 16, the second valve module 162 and the fourth valve module 164 are stopped, and the first valve module 161 and the third valve module 163 are conducted. In the second working state of the valve part 16, the first valve module 161 and the third valve module 163 are stopped, and the second valve module 162 and the fourth valve module 164 are conducted. In other technical solutions of the present application, the first valve module 161 and the second valve module 162 may be replaced by a three-way valve or a three-way flow control valve (not shown in figure). Taking a three-way valve as an example, a first connecting port of the three-way valve is in communication with the first communication port 1601, a second connecting port of the three-way valve and the second connecting port of the third valve module 163 are both in communication with the third communication port 1603, and a third connecting port of the three-way valve and the second connecting port of the fourth valve module 164 are both in communication with the second communication port 1602. In the first working state of the valve part 16, the valve part 16 opens a passway between the first connecting port of the three-way valve and the third connecting port of the three-way valve, and closes a passway between the first connecting port of the three-way valve and the third connecting port of the three-way valve. The fourth valve module is closed, and the third valve module is open. In the second working state of the valve part 16, the three-way valve closes a passway between the first connecting port and the second connecting port, and the third valve module 163 is closed. The valve part 16 opens a passway between the first connecting port of the three-way valve and the third connecting port of the three-way valve, and the fourth valve module 164 is open. Similarly, the second valve module 162 and the third valve module 163, the third valve module 163 and the fourth valve module 164, the fourth valve module 164 and the first valve module 161 may also be replaced by a three-way valve, which is not described again herein.

The thermal management system further includes a first heat exchange system and/or a second heat exchange system. A refrigerant in a refrigerant system and a cooling liquid in the first heat exchange system are isolated mutually, and the refrigerant in the refrigerant system and a cooling liquid in the second heat exchange system are isolated mutually. A first heat exchanger 11 and a second heat exchanger 12 both include a first flow channel and a second flow channel. The first flow channel is for a refrigerant, and the second flow channel is for a cooling liquid. The first flow channel and the second flow channel are isolated mutually. When the thermal management system is operated, heat is exchangeable between a refrigerant flowing through the first flow channel and a cooling liquid flowing through the second flow channel Specifically, a second connecting port of a first flow channel of the first heat exchanger 11 is in communication with the second communication port 1602, and a first connecting port of the first flow channel of the first heat exchanger 11 is in communication with the second end port 1502. A first connecting port of a first flow channel of the second heat exchanger 12 is in communication with the third end port 1503, and a second connecting port of the first flow channel of the second heat exchanger 12 is in communication with an inlet of a compressor. The first heat exchange system includes a second flow channel of the first heat exchanger 11, a fourth heat exchanger 52 and a first pump 51. The second flow channel of the first heat exchanger 11, a flow channel for a cooling liquid in the fourth heat exchanger 52 and the first pump 51 are in communication. A cooling liquid in the first heat exchange system is driven by the first pump 51 to flow. Therefore, due to the drive of the first pump 51, the second flow channel of the first heat exchanger 11, the fourth heat exchanger 52 and the first pump 51 all have an outlet and an inlet for a cooling liquid. In other words, an outlet and inlet for a cooling liquid in the second flow channel of the first heat exchanger 11, an outlet and inlet for a cooling liquid in the flow channel for the cooling liquid in the fourth heat exchanger 52, and an outlet and inlet for a cooling liquid in the first pump 51 are relative to the first pump 51. If the outlet and inlet for a cooling liquid in the first pump 51 are interchanged, outlet and inlet for a cooling liquid in the second flow channel of the first heat exchanger 11, outlet and inlet for a cooling liquid in the flow channel for the cooling liquid in the fourth heat exchanger 52, and the outlet and inlet for the cooling liquid of the first pump 51 are all changed accordingly. Similar situations occur in the second heat exchange system and a third heat exchange system hereinafter, which are not described again for simplicity. The second heat exchange system includes the second flow channel of the second heat exchanger 12, a fifth heat exchanger 31 and a second pump 32. The second flow channel of the second heat exchanger 12, the fifth heat exchanger 31 and the second pump 32 are in communication. A cooling liquid in the second heat exchange system is driven by the second pump 32 to flow. The fifth heat exchanger 31 may be a battery temperature controller used for heating or cooling a battery. That is, the fifth heat exchanger 31 may absorb heat from the battery or dissipate heat to the battery. The fifth heat exchanger 31 may be a temperature controller for other devices such as a motor, an electronic device, etc.

Figure 1:
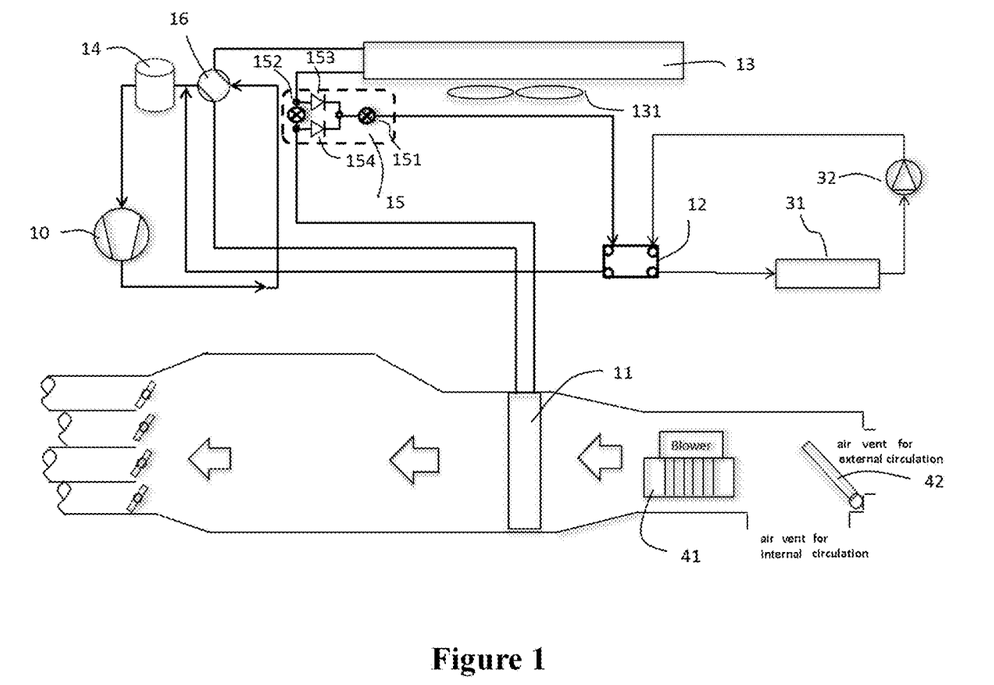
FIG. 1 is a schematic diagram of a thermal management system according to a first embodiment of the present application.
Figure 2:
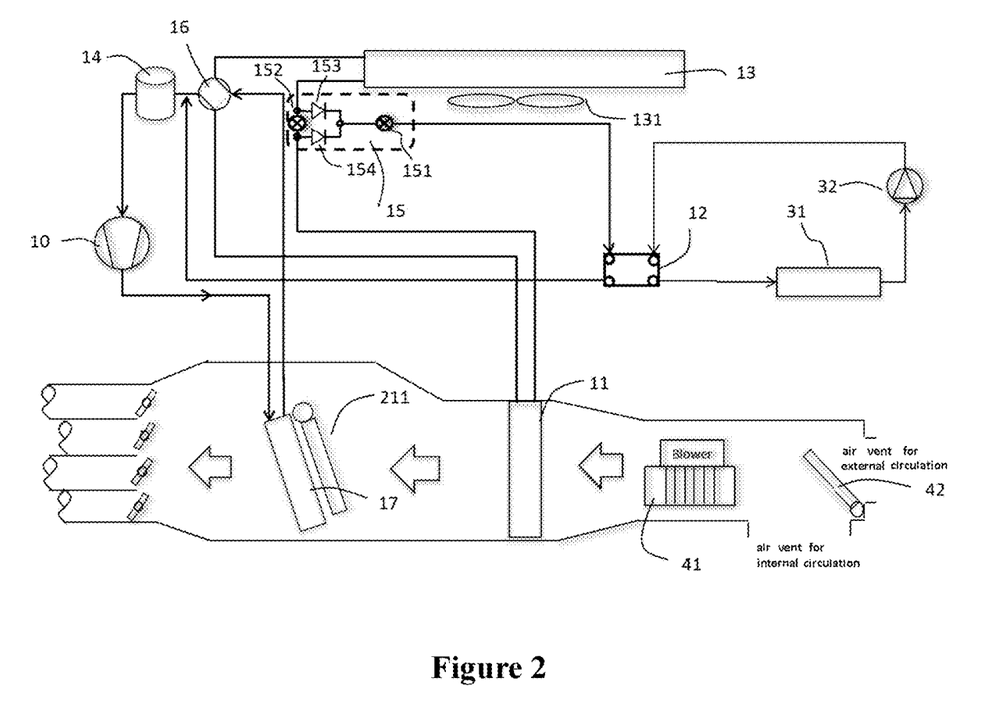
FIG. 2 is a schematic diagram of a thermal management system according to a second embodiment of the present application.
Figure 3:
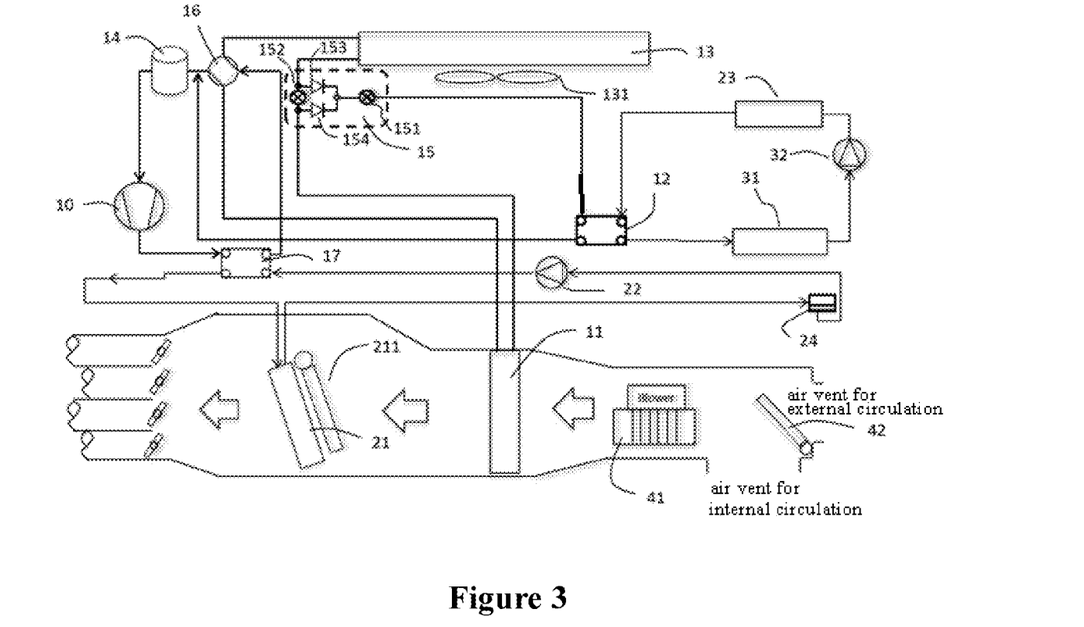
FIG. 3 is a schematic diagram of a thermal management system according to a third embodiment of the present application.
Figure 7:
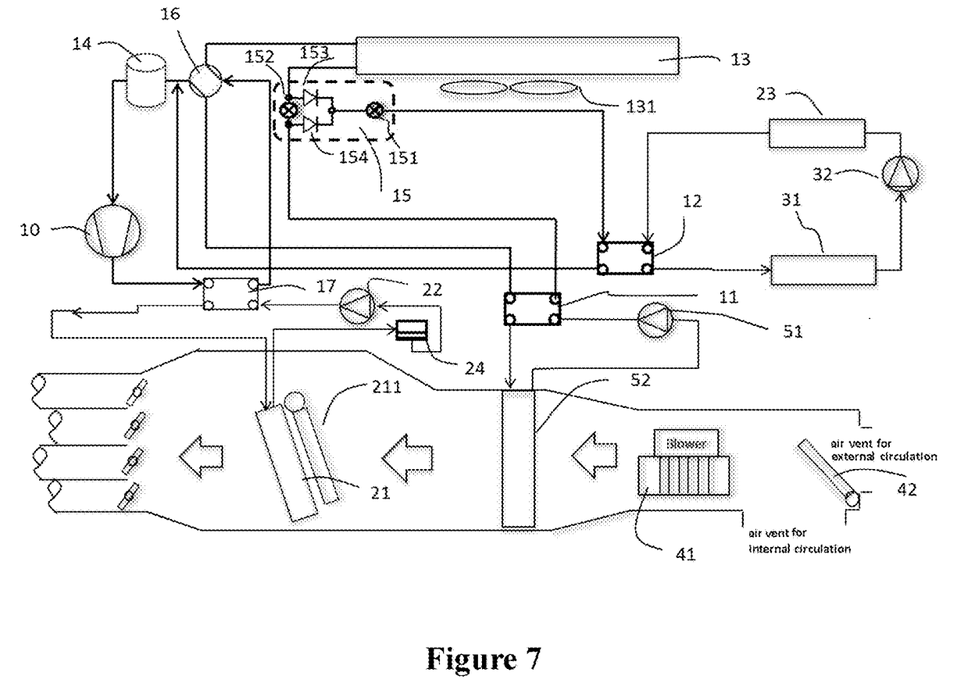
FIG. 7 is a schematic diagram of a thermal management system according to a fourth embodiment of the present application.

Referring to FIGS. 2 and 7, the thermal management system further includes a sixth heat exchanger 17. An inlet for a refrigerant of the sixth heat exchanger 17 is in communication with an outlet of the compressor 10, and an outlet for the refrigerant of the sixth heat exchanger 17 is in communication with the first communication port 1601. That is, the outlet of the compressor 10 is in communication with the first communication port 1601 through the sixth heat exchanger 17. It is understood that, the sixth heat exchanger 17 is in communication with the outlet of the compressor 10. Or, the thermal management system further includes a third heat exchange system. The refrigerant in the refrigerant system and a cooling liquid in the third heat exchange system are isolated mutually. Similarly, the sixth heat exchanger 17 includes a first flow channel and a second flow channel. The first flow channel is for a refrigerant, while the second flow channel is for a cooling liquid. The first flow channel and the second flow channel are isolated mutually. When the thermal management system is operated, heat is exchangeable between the refrigerant flowing through the first flow channel and the cooling liquid flowing through the second flow channel. An inlet for the refrigerant in the first flow channel of the sixth heat exchanger 17 is in communication with an outlet of the compressor 10, and an outlet for the refrigerant in the first flow channel of the sixth heat exchanger 17 is in communication with the first communication port 1601. The third heat management system includes the second flow channel of the sixth heat exchanger 17, a seventh heat exchanger 21 and a third pump 22. The second flow channel of the sixth heat exchanger 17, a flow channel for a cooling liquid in the seventh heat exchanger 21 and the third pump 22 are in communication. The cooling liquid in the third heat exchange system is driven by the third pump 22 to flow.

The thermal management system further includes a kettle 24. The kettle 24 is arranged at a highest position of the first heat exchange system, the second heat exchange system and the third heat exchange system. The kettle 24 is configured to exhaust bubbles in the cooling liquid of the first heat exchange system, the second heat exchange system and the third heat exchange system. The kettle 24 includes a first opening. The first heat exchange system, the second heat exchange system and the third heat exchange system is respectively in communication with the first opening of the kettle 24 through a pipe, and the kettle 24 is used for exhausting bubbles. The kettle 24 may include a first opening and a second opening, and the first opening is higher than the second opening. In technical solutions of the present application, the kettle 24 may be a part of the first heat exchange system, or the second heat exchange system. For example, an outlet for a cooling liquid in the seventh heat exchanger is in communication with the first opening of the kettle 24, and the second opening of the kettle 24 is in communication with an inlet of the third pump 22. That is, the kettle 24 is connected with the third heat exchange system through the first opening and the second opening.

The thermal management system further includes a heating device 23. The heating device 23 includes two end ports, a flow channel for a cooling liquid being in communication with the two end ports of the heating device 23, and a heating core. The heating core is configured to heat a cooling liquid flowing through the heating device 23. The heating device 23 may be an electric heating device, and may be other types of heating devices. The heating device 23 is arranged in the second heat exchange system. Specifically, in a flowing direction of the cooling liquid in the second heat exchange system, the heating device 23 is arranged between an inlet of a cooling liquid in the second flow channel of the second heat exchanger 12 and an outlet of the second pump 32. The heating device 23 may heat the cooling liquid in the second heat exchange system, and may heat a heating device such as a battery when the battery is in a low temperature. It is understood that, the heating device 23 may be arranged at other positions in the second heat exchange system. When the battery requires for cooling, the heating device 23 may be switched off. The heating device 23 is merely a flow channel for the cooling liquid in the second heat exchange system.

The thermal management system may include an air conditioning box including an air conditioning body. One end of the air conditioning box is arranged with multiple air ducts (not shown in figure) that are connected to inside of the vehicle. An air duct may be arranged with gratings (not shown in figure) configured to adjust a size of the air duct. At an air intake side of the air conditioning box, an air vent for internal circulation, an air vent for external circulation, and a circulating wind door 42 configured to adjust a size of the air vent for internal circulation and the air vent for external circulation are arranged. The wind door is in communication with a passenger compartment, thus, air in the passenger compartment enters the air conditioning box through the air vent for internal circulation, and then returns to the passenger compartment through the air duct, to realize internal circulation. The air vent for external circulation is in communication with outside. Outside air enters the air conditioning box through the air vent for external circulation, and then enters the passenger compartment through the air duct. The circulating wind door 42 is arranged between the air vent for internal circulation and the air vent for external circulation, to control switching of the air vent for internal circulation and the air vent for external circulation. When the circulating wind door 42 switches to the air vent for internal circulation, the air vent for internal circulation is closed. When the circulating wind door 42 switches to the air vent for external circulation, the air vent for external circulation is closed, and internal circulation is realized. By adjusting a position of the circulating wind door 42, a size of the air vent for internal circulation and the air vent for external circulation are adjusted accordingly, thus, a ratio of outside air to inside air of the air flowing into the air conditioning box is adjusted. A blower 41 is arranged at a position of the air conditioning box that is near the air vent for internal circulation and the air vent for external circulation. The thermal management system may include another air conditioning box. The second heat exchanger 12 and heating devices such as a battery are arranged in the air conditioning box for cooling.

The sixth heat exchanger 17 is arranged at an air duct of the air conditioning box. A temperature wind door 211 is arranged at the sixth heat exchanger 17. When the temperature wind door 211 opens, air from the air vent for internal circulation or from the air vent for external circulation may flow through at least part of the sixth heat exchanger 17 behind the temperature wind door 211. When the temperature wind door 211 is closed, the air from the air vent for internal circulation or from the air vent for external circulation cannot flow through the sixth heat exchanger 17, thus, the air flows in a passway at two sides of the temperature wind door 211, and then enters the passenger compartment through the air duct. The first heat exchanger 11 is arranged in the air duct of the air conditioning box, and in an upwind position of the sixth heat exchanger 17. That is, air flow in the air duct flows through the first heat exchanger 11 firstly, and then flows to the seventh heat exchanger 52. It is understood that, if the thermal management system includes the second heat exchange system and the third heat exchange system, the seventh heat exchanger 21, instead of the sixth heat exchanger 17, is arranged in the air conditioning box; and the fifth heat exchanger 31, instead of the first heat exchanger 11, is arranged in the air conditioning box.

The thermal management system includes a heating mode, a cooling mode, a dehumidification mode and a circulation mode. Working conditions of a thermal management system having a refrigerant system are illustrated hereinafter. Working conditions of a thermal management system having a cooling liquid system are similar as that of the thermal management system having the refrigerant system, which are not described again herein. In the heating mode, the valve part 16 is in the second working state, a refrigerant of a low temperature and low pressure in the thermal management system is compressed to be a refrigerant of a high temperature and high pressure by a compressor 10. The refrigerant of a high temperature and high pressure enters the sixth heat exchanger 17 from an outlet of the compressor 10. The temperature wind door 211 opens, and heat is exchangeable between the refrigerant in the sixth heat exchanger 17 and an air flow in the air conditioning box. After the heat exchange process, the refrigerant in the sixth heat exchanger 11 releases heat to the air flow in the air conditioning box. Since the valve part 16 is in the second working state, a first communication port 1601 of the valve part 16 and a second communication port 1602 of the valve part 16 are conducted, and a third communication port 1603 of the valve part 16 and a fourth communication port 1604 of the valve part 16 are conducted. The refrigerant releases heat in the first heat exchanger 11. The refrigerant flowing out of the first heat exchanger 11 enters a second connecting port 1502 of a flow control device 15. The flow control device 15 opens a first throttling unit 151 and/or a second throttling unit 152. The refrigerant after being throttled enters a third heat exchanger 13 and/or a second heat exchanger 12. The refrigerant flowing into the third heat exchanger 13 absorbs heat from air surrounding the third heat exchanger 13, and heat is exchangeable between the refrigerant flowing into the third heat exchanger 13 and the air surrounding the third heat exchanger 13. A fan 131 arranged near the third heat exchanger 13 blows the air surrounding the third heat exchanger 13, to form an air flow. The heat exchange process is accelerated, and the process of absorbing heat from the air is accelerated. The refrigerant flowing into the second heat exchanger 12 absorbs heat from a battery, and a heat exchange process between the refrigerant flowing into the second heat exchanger 12 and the battery occurs. The temperature wind door 211 may be closed. An air flow in the air duct bypasses the sixth heat exchanger 17. Thus, the sixth heat exchanger 17 is not involved in the heat exchange process, and merely the first heat exchanger 11 releases heat to the passenger compartment. In addition, when the requirement for heating by the passengers is not high, the valve part 16 may be in the first working state, that is, the first communication port 1601 is conducted to the third communication port 1603, and the second communication port 1602 is conducted to the fourth communication port 1604. The refrigerant of a high temperature and high pressure releases heat into the air conditioning box in the first heat exchanger 11. Meanwhile, the third heat exchanger 13, as a condenser, releases heat, and the flow control device 15 closes the second throttling unit 152, the flow control device 15 opens the first throttling unit 151, and the second heat exchanger 12, as an evaporator, absorbs the heat from the battery and so on, and no refrigerant is flowed in the first heat exchanger 11, and the first heat exchanger 11 is not involved in heat exchange.

When the humidity of the passenger compartment is high, water vapor in air is easy to condense on glass windows of the vehicle, which may affect view and cause security risks. Therefore, dehumidification is necessary to dehumidify the air in the passenger compartment. That is, the dehumidification mode of the thermal management system is operated when the temperature is low and requires for heating strongly. In the dehumidification mode, the temperature wind door 211 is open, and the valve part 16 is in the first working state. An outlet for a refrigerant of the first heat exchanger 11 is in communication with the second connecting port of the third heat exchanger 13. The refrigerant in the third heat exchanger dissipated heat to air, and a heat exchange process between the refrigerant in the third heat exchanger and the air occurs. The flow control device 15 opens the second throttling unit 152, or opens both the second throttling unit 152 and the first throttling unit 151. The refrigerant is converted to a refrigerant of a high temperature and high pressure after being compressed by the compressor 10. The refrigerant exhausted by the compressor 10 enters the sixth heat exchanger 17. Since the temperature wind door 211 is open, the refrigerant of a high temperature and high pressure releases heat to the air flow in the air conditioning box of the sixth heat exchanger 17, to heat the air flow in the air duct of the air conditioning box. The refrigerant flowing out of the sixth heat exchanger 17 enters the third heat exchanger 13 through the valve part 16, and releases heat in the third heat exchanger 13. Then the refrigerant enters the first connecting port 1501 of the flow control device 15. The flow control device controls to open the second throttling unit 152, or to open the first throttling unit 151 and the second throttling unit 152 simultaneously. The refrigerant is throttled by the first throttling unit 151 and the second throttling unit 152 respectively, and is converted to a refrigerant of a low temperature and low pressure. The refrigerant of a low temperature and low pressure absorbs heat from air surrounding the first heat exchanger 11, and a heat exchange process between the refrigerant of a low temperature and low pressure and the air surrounding the first heat exchanger 11 occurs. Since the humidity of a surface of the first heat exchanger 11 is low, air may be condensed, thus, the temperature of the air is lowered and the dehumidification process is realized. The refrigerant flowing through the first heat exchanger 11 then enters an inlet of the compressor 10 through a gas-liquid separator. Similarly, the refrigerant is converted to be a refrigerant of a low temperature and low pressure after being throttled by the first throttling unit 151. The refrigerant of a low temperature and low pressure absorbs heat from the battery in the second heat exchanger 12. The refrigerant of a low temperature and low pressure enters the inlet of the compressor 10 through the gas-liquid separator. If the temperature of the battery is lower than a working temperature thereof, the first throttling unit 151 may be closed under the control of the flow control device 15.

When the temperature in the passenger compartment is high and cooling is required to comfort the passengers, the thermal management system is switched to the cooling mode. In the cooling mode, the refrigerant is converted to be a refrigerant of a high temperature and high pressure after being compressed by the compressor 10. The refrigerant of a high temperature and high pressure exhausted by the compressor 10 enters the sixth heat exchanger 17. Since the temperature wind door 211 of the sixth heat exchanger 17 is closed, the sixth heat exchanger 17 is not involved in a heat exchange process. The valve part 16 is in the first working state. The refrigerant exhausted by the first heat exchanger 11 enters the second connecting port of the third heat exchanger 13 through the valve part 16. The refrigerant releases heat to air surrounding the third heat exchanger 13, and a heat exchange process between the refrigerant and the air surrounding the third heat exchanger 13 occurs. After that, the refrigerant becomes a refrigerant of a low temperature and high pressure. The refrigerant then enters the first connecting port 1501 of the flow control device 15. The second throttling device is switched on. The refrigerant is throttled by the first throttling unit 151 and then enters the first heat exchanger 11. The refrigerant in the first heat exchanger 11 absorbs heat from the air flow, that is, air surrounding the first heat exchanger 11 is cooled by the refrigerant. If both the passenger compartment and the battery require for cooling, the flow control device 15 may control to open the first throttling unit 151. Thus, the refrigerant exhausted from the first connecting port of the third heat exchanger 13 may be throttled by the first throttling unit 151, and absorb heat from the battery in the second heat exchanger, to lower the temperature of the battery.

Compared to the conventional technology, the thermal management system provided by the present application includes a flow control device. The flow control device includes three end ports which are in communication with the thermal management system, thereby simplifying the thermal management system.

It is noted that, the embodiments described above are merely illustrative, and should not be understood as to limit technical solutions of the present application, for example, the directional terms such as "front", "back", "right", "left", "up", "down" and so on. Although the present application has been described in detail in conjunction with the above embodiments, it should be understood by those skilled in the art that, various forms of combination, modifications and variants may be made to the present application. And any technical solutions and improvements thereof without departing from the spirit and scope of the present application will fall in the scope of protection of the present application.

The invention claimed is:

1. A thermal management system, comprising:
a flow control device,
wherein the flow control device comprises a first throttling unit, a second throttling unit and a valve component,
wherein the flow control device comprises a first end port, a second end port and a third end port;
wherein a first connecting port of the second throttling unit and a first connecting port of the valve component are both communicable with the first end port of the flow control device, a second connecting port of the second throttling unit and a second connecting port of the valve component are both communicable with the second end port of the flow control device, a third connecting port of the valve component is communicable with a first connecting port of the first throttling unit, and a second connecting port of the first throttling unit is communicable with the third end port of the flow control device;
wherein the thermal management system further comprises a first heat exchanger, a second heat exchanger and a third heat exchanger, the first end port of the flow control device is in communication with a first connecting port of the third heat exchanger, the second end port of the flow control device is in communication with a first connecting port of the first heat exchanger, and the third end port of the flow control device is in communication with a first connecting port of the second heat exchanger; and
wherein the thermal management system comprises a first working state and a second working state, a refrigerant in the heat management system flows into the first end port of the flow control device from the first connecting port of the third heat exchanger in the first working state of the thermal management system, the refrigerant in the thermal management system flows into the second end port of the flow control device from the first connecting port of the first heat exchanger in the second working state, and the refrigerant in the thermal management system flows out of the flow control device through the third end port in the first working state and the second working state of the thermal management system.

2. The thermal management system according to claim 1, further comprising:
a valve part, and
a compressor;
wherein the valve part comprises a first communication port, a second communication port, a third communication port and a fourth communication port, the first communication port is in communication with an outlet of the compressor, the fourth communication port is in communication with an inlet of the compressor, the second communication port is in communication with the second connecting port of the first heat exchanger, and the third communication port is in communication with the second connecting port of the third heat exchanger;
wherein in the first working state of the thermal management system, the first communication port and the third communication port are conducted, and the fourth communication port and the second communication port are conducted; and
wherein in the second working state of the thermal management system, the first communication port and the second communication port are conducted, and the third communication port and the fourth communication port are conducted.

3. The thermal management system according to claim 2, wherein the valve part further comprises a multi-way valve, the multi-way valve comprises a first inlet, a first valve hole, a second valve hole and a third valve hole;
wherein the first inlet is in communication with the first communication port, the first valve hole is in communication with the third communication port, the second valve hole is in communication with the fourth communication port, and the third valve hole is in communication with the second communication port; in the first working state of the thermal management system, a passway between the first inlet and the first valve hole is conducted, and a passway between the second valve hole and the third valve hole is conducted; in the second working state of the thermal management system, a passway between the first inlet and the third valve hole is conducted, and a passway between the first valve hole and the second valve hole is conducted; or
wherein the valve part comprises a first valve module, a second valve module, a third valve module and a fourth valve module, a first connecting port of the first valve module and a first connecting port of the second valve module are both in communication with the first communication port, a second connecting port of the first valve module and a second connecting port of the fourth valve module are both in communication with the second communication port, a second connecting port of the second valve module and a second connecting port of the third valve module are both in communication with the third communication port, and a first connecting port of the third valve module and a first connecting port of the fourth valve module are both in communication with the fourth communication port; in the first working state of the thermal management system, the second valve module and the fourth valve module are switched off, and the first valve module and the third valve module are switched on; and in the second working state of the thermal management system, the first valve module and the third valve module are switched off, and the second valve module and the fourth valve module are switched on.

4. The thermal management system according to claim 1, wherein the thermal management system further comprises a first heat exchange system, the first heat exchanger comprises a first flow channel and a second flow channel, a first connecting port of the first flow channel of the first heat exchanger is in communication with the second end port; the first heat exchange system comprises a first pump, the second flow channel of the first heat exchanger and a fourth heat exchanger; the first pump, the second flow channel of the first heat exchanger and the fourth heat exchanger are in communication; and heat is exchangeable between the first heat exchange system and the refrigerant system in the first heat exchanger; and/or
wherein the thermal management system comprises a second heat exchange system, the second heat exchanger comprises a first flow channel and a second flow channel, a first connecting port of the first flow channel of the second heat exchanger is in communication with the third end port; the second heat exchange system comprises a second pump, the second flow channel of the second heat exchanger and a fifth heat exchanger; the second pump, the second flow channel of the second heat exchanger and the fifth heat exchanger are in communication; and heat is exchangeable between the second heat exchange system and the refrigerant system in the second heat exchanger.

5. The thermal management system according to claim 2, wherein the thermal management system comprises a sixth heat exchanger, a first connecting port of the sixth heat exchanger is in communication with the outlet of the compressor, and a second connecting port of the sixth heat exchanger is in communication with the first communication port of the valve part; or wherein the thermal management system comprises a third heat exchange system, the sixth heat exchanger comprises a first flow channel and a second flow channel, a first connecting port of the first flow channel of the sixth heat exchanger is in communication with the outlet of the compressor, and a second connecting port of the first flow channel of the sixth heat exchanger is in communication with the first communication port; the third heat exchange system comprises a third pump, the second flow channel of the sixth heat exchanger and a seventh heat exchanger; the third pump, the second flow channel of the sixth heat exchanger and the seventh heat exchanger are in communication; and heat is exchangeable between the third heat exchange system and the refrigerant system in the sixth heat exchanger.

6. The thermal management system according to claim 4, wherein the thermal management system comprises a sixth heat exchanger, a first connecting port of the sixth heat exchanger is in communication with the outlet of the compressor, and a second connecting port of the sixth heat exchanger is in communication with the first communication port of the valve device;

or, wherein the thermal management system comprises a third heat exchange system, the sixth heat exchanger comprises a first flow channel and a second flow channel, a first connecting port of the first flow channel of the sixth heat exchanger is in communication with the outlet of the compressor, and a second connecting port of the first flow channel of the sixth heat exchanger is in communication with the first communication port; the third heat exchange system comprises a third pump, the second flow channel of the sixth heat exchanger and a seventh heat exchanger; the third pump, the second flow channel of the sixth heat exchanger and the seventh heat exchanger are in communication; and heat is exchangeable between the third heat exchange system and the refrigerant system in the sixth heat exchanger.

7. A flow control device, comprising:
a first throttling unit,
a second throttling unit, and
a valve component;
wherein the flow control device comprises a first end port, a second end port, and a third end port, the first throttling unit and the second throttling unit both comprises two connecting ports, and the valve component comprises a first connecting port, a second connecting port, a third connecting port; and
wherein the first connecting port of the second throttling unit is in communication with the first end port of the flow control device, the second connecting port of the second throttling unit is in communication with the second end port of the flow control device, the first connecting port of the valve component is in communication with the first end port of the flow control device, the second connecting port of the valve component is in communication with the second end port of the flow control device, the third connecting port of the valve component is in communication with the first connecting port of the first throttling unit, and the second connecting port of the first throttling unit is in communication with the third end port of the flow control device.

8. The flow control device according to claim 7, comprising a first working state and a second working state;
wherein in the first working state of the flow control device, the first throttling unit and/or the second throttling unit is switched on by the flow control device, the valve component switches on a passway between the first connecting port of the valve component and the third connecting port of the valve component, and the valve component switches off a passway between the third connecting port of the valve component and the second connecting port of the valve component; and
in the second working state of the flow control device, the first throttling unit and/or the second throttling unit is switched on, the valve component stops a passway between the third connecting port of the valve component and the first connecting port of the valve component, and the valve component opens a passway between the second connecting port of the valve component and the third connecting port of the valve component.

9. The flow control device according to claim 7, wherein the valve component comprises a first three-way valve, a first connecting port of the first three-way valve is in communication with the first connecting port of the valve component, a second connecting port of the first three-way valve is in communication with the second connecting port of the valve component, and a third connecting port of the first three-way valve is in communication with the third connecting port of the valve component.

10. The flow control device according to claim 7, wherein the valve component comprises a first valve unit and a second valve unit, a first connecting port of the first valve unit is in communication with the second connecting port of the valve component, a first connecting port of the second valve unit is in communication with the first connecting port of the valve component, a second connecting port of the first valve unit is in communication with the third connecting port of the valve component, and a second connecting port of the second valve unit is in communication with the third connecting port of the valve component.

11. The flow control device according to claim 10, wherein the first valve unit comprises a stopping valve or a flow control valve, and the second valve unit comprises a stopping valve or a flow control valve; or the first valve unit comprises a first one-way valve and the second valve unit comprises a second one-way valve, an inlet of the first one-way valve is in communication with the second connecting port of the valve component, an inlet of the second one-way valve is in communication with the first connecting port of the valve component, an outlet of the first one-way valve is in communication with the third connecting port of the valve component, and an outlet of the second one-way valve is in communication with the third connecting port of the valve component;

or, the first valve unit comprises a first one-way valve and the second valve unit comprises a stopping valve or a flow control valve, an inlet of the first one-way valve is in communication with the second connecting port of the valve component, an outlet of the first one-way valve is in communication with the third connecting port of the valve component, and two ends of the second valve unit are in communication with the first connecting port of the valve component and the third connecting port of the valve component respectively;

or, the second valve unit comprises a second one-way valve and the first valve unit comprises a stopping valve or a flow control valve, an inlet of the second one-way valve is in communication with the first connecting port of the valve component, an outlet of the second one-way valve is in communication with the third connecting port of the valve component, and two ends of the first valve unit are in communication with the second connecting port of the valve component and the third connecting port of the valve component respectively.

12. The flow control device according to claim 7, wherein the first throttling unit comprises a capillary, a first connecting port of the capillary is in communication with the third connecting port of the valve device, and a second connecting port of the capillary is in communication with the third end port; and the second throttling unit comprises a capillary, a first connecting port of the capillary is in communication with the third connecting port of the valve device, and a second connecting port of the capillary is in communication with the third end port;

or, the first throttling unit comprises an electronic expansion valve, a first connecting port of the electronic expansion valve is in communication with the first end port, and a second connecting port of the electronica expansion valve is in communication with the third end port; the second throttling unit comprises an electronic expansion valve, a first connecting port of the electronic expansion valve is in communication with the first end port, and a second connecting port of the electronic expansion valve is in communication with the third end port.

13. The flow control device according to claim 9, wherein the first throttling unit comprises a capillary, a first connecting port of the capillary is in communication with the third connecting port of the valve component, and a second connecting port of the capillary is in communication with the third end port; and the second throttling unit comprises a capillary, a first connecting port of the capillary is in communication with the third connecting port of the valve component, and a second connecting port of the capillary is in communication with the third end port;

or, the first throttling unit comprises an electronic expansion valve, a first connecting port of the electronic expansion valve is in communication with the first end port, and a second connecting port of the electronica expansion valve is in communication with the third end port; the second throttling unit comprises an electronic expansion valve, a first connecting port of the electronic expansion valve is in communication with the first end port, and a second connecting port of the electronica expansion valve is in communication with the third end port.

14. The flow control device according to claim 10, wherein the first throttling unit comprises a capillary, a first connecting port of the capillary is in communication with the third connecting port of the valve device, and a second connecting port of the capillary is in communication with the third end port; and the second throttling unit comprises a capillary, a first connecting port of the capillary is in communication with the third connecting port of the valve device, and a second connecting port of the capillary is in communication with the third end port;

or, the first throttling unit comprises an electronic expansion valve, a first connecting port of the electronic expansion valve is in communication with the first end port, and a second connecting port of the electronica expansion valve is in communication with the third end port; the second throttling unit comprises an electronic expansion valve, a first connecting port of the elec­tronic expansion valve is in communication with the first end port, and a second connecting port of the electronica expansion valve is in communication with the third end port.

15. The thermal management system according to claim 2, wherein the thermal management system further comprises a first heat exchange system, the first heat exchanger comprises a first flow channel and a second flow channel, a first connecting port of the first flow channel of the first heat exchanger is in communication with the second end port; the first heat exchange system comprises a first pump, the second flow channel of the first heat exchanger and a fourth heat exchanger; the first pump, the second flow channel of the first heat exchanger and the fourth heat exchanger are in communication; and heat is exchangeable between the first heat exchange system and the refrigerant system in the first heat exchanger; and/or wherein the thermal management system comprises a second heat exchange system, the second heat exchanger comprises a first flow channel and a second flow channel, a first connecting port of the first flow channel of the second heat exchanger is in communication with the third end port; the second heat exchange system comprises a second pump, the second flow channel of the second heat exchanger and a fifth heat exchanger; the second pump, the second flow channel of the second heat exchanger and the fifth heat exchanger are in communication; and heat is exchangeable between the second heat exchange system and the refrigerant system in the second heat exchanger.

16. The thermal management system according to claim 3, wherein the thermal management system comprises a sixth heat exchanger, a first connecting port of the sixth heat exchanger is in communication with the outlet of the compressor, and a second connecting port of the sixth heat exchanger is in communication with the first communication port of the valve part; or wherein the thermal management system comprises a third heat exchange system, the sixth heat exchanger comprises a first flow channel and a second flow channel, a first connecting port of the first flow channel of the sixth heat exchanger is in communication with the outlet of the compressor, and a second connecting port of the first flow channel of the sixth heat exchanger is in communication with the first communication port; the third heat exchange system comprises a third pump, the second flow channel of the sixth heat exchanger and a seventh heat exchanger; the third pump, the second flow channel of the sixth heat exchanger and the seventh heat exchanger are in communication; and heat is exchangeable between the third heat exchange system and the refrigerant system in the sixth heat exchanger.

17. The flow control device according to claim 8, wherein the valve component comprises a first three-way valve, a first connecting port of the first three-way valve is in communication with the first connecting port of the valve component, a second connecting port of the first three-way valve is in communication with the second connecting port of the valve component, and a third connecting port of the first three-way valve is in communication with the third connecting port of the valve component.

18. The flow control device according to claim 8, wherein the valve component comprises a first valve unit and a second valve unit, a first connecting port of the first valve unit is in communication with the second connecting port of the valve component, a first connecting port of the second valve unit is in communication with the first connecting port of the valve component, a second connecting port of the first valve unit is in communication with the third connecting port of the valve component, and a second connecting port of the second valve unit is in communication with the third connecting port of the valve component.

19. The flow control device according to claim 8, wherein the first throttling unit comprises a capillary, a first connecting port of the capillary is in communication with the third connecting port of the valve device, and a second connecting port of the capillary is in communication with the third end port; and the second throttling unit comprises a capillary, a first connecting port of the capillary is in communication with the third connecting port of the valve device, and a second connecting port of the capillary is in communication with the third end port;

or, the first throttling unit comprises an electronic expansion valve, a first connecting port of the electronic expansion valve is in communication with the first end port, and a second connecting port of the electronica expansion valve is in communication with the third end port; the second throttling unit comprises an electronic expansion valve, a first connecting port of the electronic expansion valve is in communication with the first end port, and a second connecting port of the electronic expansion valve is in communication with the third end port.

20. The flow control device according to claim 11, wherein the first throttling unit comprises a capillary, a first connecting port of the capillary is in communication with the third connecting port of the valve device, and a second connecting port of the capillary is in communication with the third end port; and the second throttling unit comprises a capillary, a first connecting port of the capillary is in communication with the third connecting port of the valve device, and a second connecting port of the capillary is in communication with the third end port;

or, the first throttling unit comprises an electronic expansion valve, a first connecting port of the electronic expansion valve is in communication with the first end port, and a second connecting port of the electronica expansion valve is in communication with the third end port; the second throttling unit comprises an electronic expansion valve, a first connecting port of the electronic expansion valve is in communication with the first end port, and a second connecting port of the electronic expansion valve is in communication with the third end port.

* * * * *